United States Patent [19]
Jefferis et al.

[11] Patent Number: 5,339,081
[45] Date of Patent: Aug. 16, 1994

[54] VEHICLE DETECTION SYSTEMS

[75] Inventors: Brian Jefferis; Shaun D. Morgan, both of Hampshire, England

[73] Assignee: Peek Traffic Limited, Hampshire, England

[21] Appl. No.: 866,219

[22] Filed: Apr. 9, 1992

[30] Foreign Application Priority Data

Apr. 9, 1991 [GB] United Kingdom ............... 9107476

[51] Int. Cl.$^5$ .............................................. G01S 13/56
[52] U.S. Cl. ........................................ 342/28; 342/61; 342/69; 342/456
[58] Field of Search ................ 342/28, 61, 69, 456

[56] References Cited

U.S. PATENT DOCUMENTS

| | | | |
|---|---|---|---|
| 2,521,683 | 9/1950 | Barker | 342/69 |
| 2,620,470 | 12/1952 | Rather, Jr. et al. | 342/69 |
| 2,622,140 | 12/1952 | Müller et al. | 342/69 X |
| 3,457,546 | 7/1969 | Preti | 342/69 X |
| 3,531,588 | 9/1970 | Kartchner | 358/105 |
| 3,644,883 | 2/1972 | Borman et al. | 342/57 X |
| 3,697,941 | 10/1972 | Christ | 342/457 X |
| 3,735,335 | 5/1973 | Kaplan et al. | 342/52 X |
| 3,836,965 | 9/1974 | Preti | 342/28 |
| 3,899,671 | 8/1975 | Stover | 342/71 X |
| 3,911,432 | 10/1975 | Williams . | |
| 3,932,871 | 1/1976 | Foote | 342/28 |
| 3,942,178 | 3/1976 | Hackett | 342/28 |
| 4,023,017 | 5/1977 | Ceseri | 342/69 X |
| 4,025,922 | 5/1977 | Trawick, III | 342/24 |
| 4,053,887 | 10/1977 | Holford | 342/114 |
| 4,527,151 | 7/1985 | Byrne | 342/28 |
| 4,746,879 | 5/1988 | Ma et al. . | |
| 4,866,447 | 9/1989 | Loucks . | |
| 4,991,146 | 2/1991 | Ransdell et al. . | |
| 5,087,918 | 2/1992 | May et al. | 342/85 |
| 5,196,826 | 3/1993 | Whiting | 340/554 |
| 5,214,408 | 5/1993 | Asayama | 340/435 |

FOREIGN PATENT DOCUMENTS

| | | |
|---|---|---|
| 0497093A2 | 8/1992 | European Pat. Off. . |
| 2199153 | 4/1974 | France . |
| 2210227 | 6/1989 | United Kingdom . |

Primary Examiner—John B. Sotomayor
Attorney, Agent, or Firm—Howard L. Rose

[57] ABSTRACT

In a vehicle presence detection system for controlling traffic signal lights at a road intersection, the vehicle detection is performed by targeting vehicles at the location of interest with an FMCW radar beam. The radar can be switched repeatedly between the FMCW mode, for vehicle presence detection, and a doppler mode, for vehicle movement detection. Signal data representing the background of the scene viewed by the radar beam are stored for use by circuitry that determines whether an apparent vehicle presence detect is a true vehicle detect; the background signal data is repeatedly updated, as necessary, as the system cycles. Temperature compensation is provided and entry into the FMCW mode is inhibited if a voltage-controlled oscillator provided for generating the emissions has not settled down after any such compensation.

12 Claims, 9 Drawing Sheets

Fig.1.

TRANSMIT & RECEIVE FREQ. WAVEFORMS, INCLUDING DOPPLER SHIFT

VEHICLE DETECTION SYSTEMS

FIELD OF INVENTION

This invention relates to vehicle detector systems, more particularly as used for detecting the arrival and presence of road vehicles for the purposes of traffic control and the operation of traffic signals.

BACKGROUND OF THE INVENTION

Road traffic lights responding automatically to the arrival and presence of vehicles have long been known and were originally operated by the passage of the approaching vehicles over pressure switches installed in the road across the traffic lanes. Those suffered from the disadvantage of being subjected to great wear and tear and the possibility of serious damage from the vehicles passing over, as well as being difficult to protect on a long-term basis against weather and the ingress of water and dirt. They were therefore superseded by the present-day systems in which the detector device responding to the arrival and presence of a vehicle is an inductive electrical loop buried in the road. But these have brought their own set of problems, notably susceptibility to environmental drift and cross-talk between loops installed in proximity to one another, with the result that the electronic networks employed for evaluating the signals from such vehicle-presence-detector loops have become increasingly complex. It is therefore an object of the present invention to provide a new approach to road vehicle presence detection.

SUMMARY OF THE INVENTION

According to the present invention, there is provided a method of vehicle presence detection for the control of traffic signal lights, such as at road intersections, characterised in that the vehicle presence or absence indication is obtained by employing at least one frequency modulated continuous wave (FMCW) radar beam to view the location of interest.

In the preferred case, the radar is repeatedly switched between an FMCW mode, to detect vehicle presence, in which ramped frequencies are emitted and a doppler mode, to detect vehicle movement, in which a constant frequency is emitted.

Preferably also, the doppler mode normally follows the FMCW mode in sequence except that before each FMCW sweep a test is made to check if a voltage controlled oscillator (VCO) comprised in the emission source is stable and if the VCO is unstable the radar is switched directly into the doppler mode.

At start-up of the radar, data representing the background scene of the location viewed by the radar beam may be stored, said data being employed to check whether an apparent FMCW mode vehicle presence detect is a true vehicle detect, and said stored background data may be updated, if necessary, each time the radar enters the FMCW mode.

The invention further includes the use of an FMCW radar to detect the presence of vehicles at a road intersection for the control of traffic signal lights.

In another aspect, the invention provides apparatus for detecting the presence of vehicles for the control of traffic signal lights, characterised by at least one FMCW radar head for mounting on or adjacent to a traffic signal light head to view the location controlled by the signal lights and means to deliver a detect signal output whenever a vehicle takes up a position where it is a target for the radar beam.

One system in accordance with the invention will now be described in more detail, by way of example, with reference to the accompanying drawings.

DESCRIPTION OF THE PREFERRED EMBODIMENT OF THE INVENTION

The basic principle of frequency modulated continuous wave (FMCW) radar is that a linearly frequency modulated beam is directed at a stationary target to be detected. The return from the target is then mixed in the radar system with the currently transmitted signal. The frequency of the output from the mixer, being the difference between the frequency of the current signal and the frequency of the return signal, is directly related to the target's range. Also the amplitude of the mixer output is related to the equivalent echoing area of the target.

Let $F_i$ = instantaneous carrier frequency as a function of time.

$F_o$ = unmodulated carrier frequency
$F_m(t)$ = modulation frequency
The transmitted frequency equation is $$F_i = F_o + F_m(t)$$

The received frequency equation is $$F_i, \text{reflected} = F_o + F_m(t - T_e)$$

where $T_e$ is the time that has elapsed since the signal was transmitted.

Therefore, the frequency difference $F_d$ is $$\begin{aligned} F_d &= F_i - F_i, \text{reflected} \\ &= F_m(t) - F_m(t - T_e) \end{aligned}$$

If the modulation wave shape (sweep) is triangular, the frequency as a function of time can be expressed as $$F_m(t) = At + B$$

where
A = slope at any time interval t
B = corresponding intercept
and therefore $$F_d = A \cdot T_e$$

If R is the range of the target and c is the signal propagation speed, then $$T_e = 2 \cdot R/c$$

from which we get $$R = c \cdot Fd/2 \cdot A$$

Figure 1:
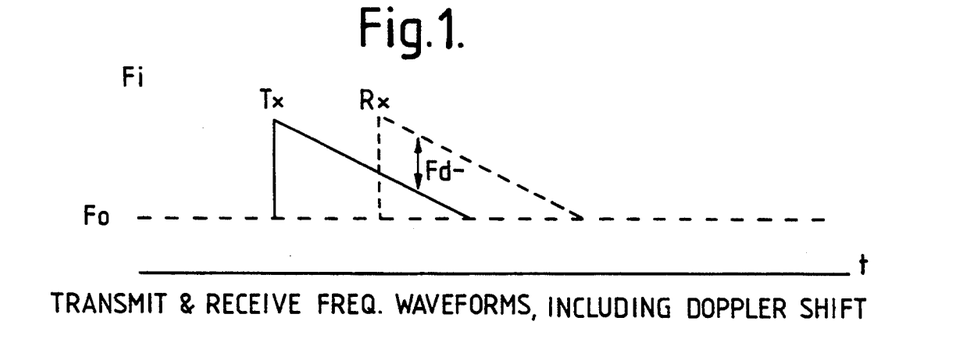
FIG. 1 illustrates the difference frequency due to range including doppler shift if the vehicle is moving.

If the vehicle is moving, the doppler shift is either added to the nominal target return range frequency or subtracted from it, depending on the sense of the frequency modulation (sweep) of the radar, i.e. whether the frequency is increasing or decreasing. FIG. 1 shows the decreasing frequency case, represented by:

$$Fd\text{-} = Fd + Fdop$$

If the radar is pointed down a road it will produce a signal incorporating the background and vehicle targets. The signal can be analyzed using numerical harmonic analysis and any stationary background return frequencies can be removed by environmental background tracking.

We will now give a numerical example.

The frequencies of the harmonics are governed by the slope A
where
A = Fmax/T
Fmax = maximum frequency change = 15 MHZ
T = total time of sweep = 720 $\mu$s
In this case
sweep rate A = 20.8 GHZ/S
The return frequencies are given by the equation $$Fd = A \cdot Te$$

where
Te = (2·R)/C
R = range in meters
C = 300000 km/s
The radar has 8 frequency gates and the harmonic frequencies increase in multiples of
Fd = 1.389 KHZ (every 10 meters)
the highest frequency being limited at 80 meters
i.e. Fd = 11.112 KHZ (Fd at 80 meters)
Fourier analysis dictates that by using a 15 MHZ bandwidth the lowest frequency we can calculate from it is $$Fl = 1/(N \cdot t)$$

where
N = number of samples
t = time between samples
With the number of samples as 16 and the time between samples 45 $\mu$s
Fl = 1.389 KHZ (Fd at 10 meters)
The maximum frequency then becomes $$Fh = 8/(N \cdot t)$$
$$= 11.112 \text{ KHZ}$$

The sweep will be produced approximately every 10 ms and therefore a vehicle travelling at 100 mph (44.44 m/s) will move a distance of 0.44 meters before the next sweep. The doppler shift will be in this case $$Fdop = (RR \cdot 2)/Y$$
$$= 3.11 \text{ KHZ}$$

where

-continued
$$Y = 0.02857 \text{ m} \ \& \ RR = 44.44 \text{ m/s}$$

There will thus be an apparent 20 meter shift in the range data at an assumed maximum speed of 100 mph; and the system cannot invoke a presence detect from vehicles travelling at a speed that causes a doppler shift frequency greater than 1.389 KHZ $$RR = Fdop \cdot Y/2 = 20.7 \text{ m/s}$$

In practice, vehicles moving at speeds over 30 mph (13.3 m/s) will not invoke a presence detect, due to the software tracking routine.

The system can, however, be used for movement detection and speed measurement.

If 16 samples are taken over a period of 3.84 ms:

$$F(\text{min}) = 1/(16 \cdot 240 \ \mu s)$$
$$= 260 \text{ Hz}$$
$$F(\text{max}) = 8/(16 \cdot 240 \ \mu s)$$
$$= 2083 \text{ Hz}$$

Therefore, the minimum speed seen is $$RR = (Fdop(\text{min}) \cdot C)/(2 \cdot Fo)$$
$$= 3.69 \text{ m/s}$$
$$= 8 \text{ mph}$$

The maximum speed seen is $$RR = 29.5 \text{ m/s}$$
$$= 65 \text{ mph}$$

In practice, the minimum and maximum speeds seen are lower and higher than these values since the harmonic analysis is only approximate.

With 8 speed gates, it will be possible to indicate the average speed of the traffic:

| speed gate | mph |
| --- | --- |
| 1 | 0 to 8 |
| 2 | 8 to 16 |
| 3 | 16 to 24 |
| 4 | 24 to 32 |
| 5 | 32 to 40 |
| 6 | 40 to 48 |
| 7 | 48 to 56 |
| 8 | 56 to 64 |

This information may be made available in different ways and, if desired, a speed threshold level may be set so that only vehicles over a specified speed will be detected. Of course, this technique will only give an estimated average speed of the traffic flow.

By measuring the time between negative-going waveform transitions, produced by the movement of a particular vehicle, the speed of that vehicle can be calculated. This gives, if desired, the ability to select any speed to produce a detect output and will enable a cutoff to be exercised at speeds below, say 5 mph. Samples of the waveform are still taken and these are used to decide what is a valid detect.

The radar may be mounted on a traffic signal light head or on a purpose built pole depending on the situation.

At single lane junctions the radar can be visually aligned either from the top of a road centre traffic signal light head or from the top of the pavement signal head, looking towards oncoming vehicles; normally a 30 degree tilt and a 20 degree angle will be appropriate. The radar beam will see all of the oncoming traffic between 0 and 40 meters but not the receding traffic. The radar will see static vehicles to within approximately 6 meters of the stop line.

On dual lane roads, two radars will be required, either one on each signal head both aligned as above, or with one looking across the stop line using the presence detect output only. If one radar is used to look across the stop line then it can be mounted on either signal head.

Figure 2:
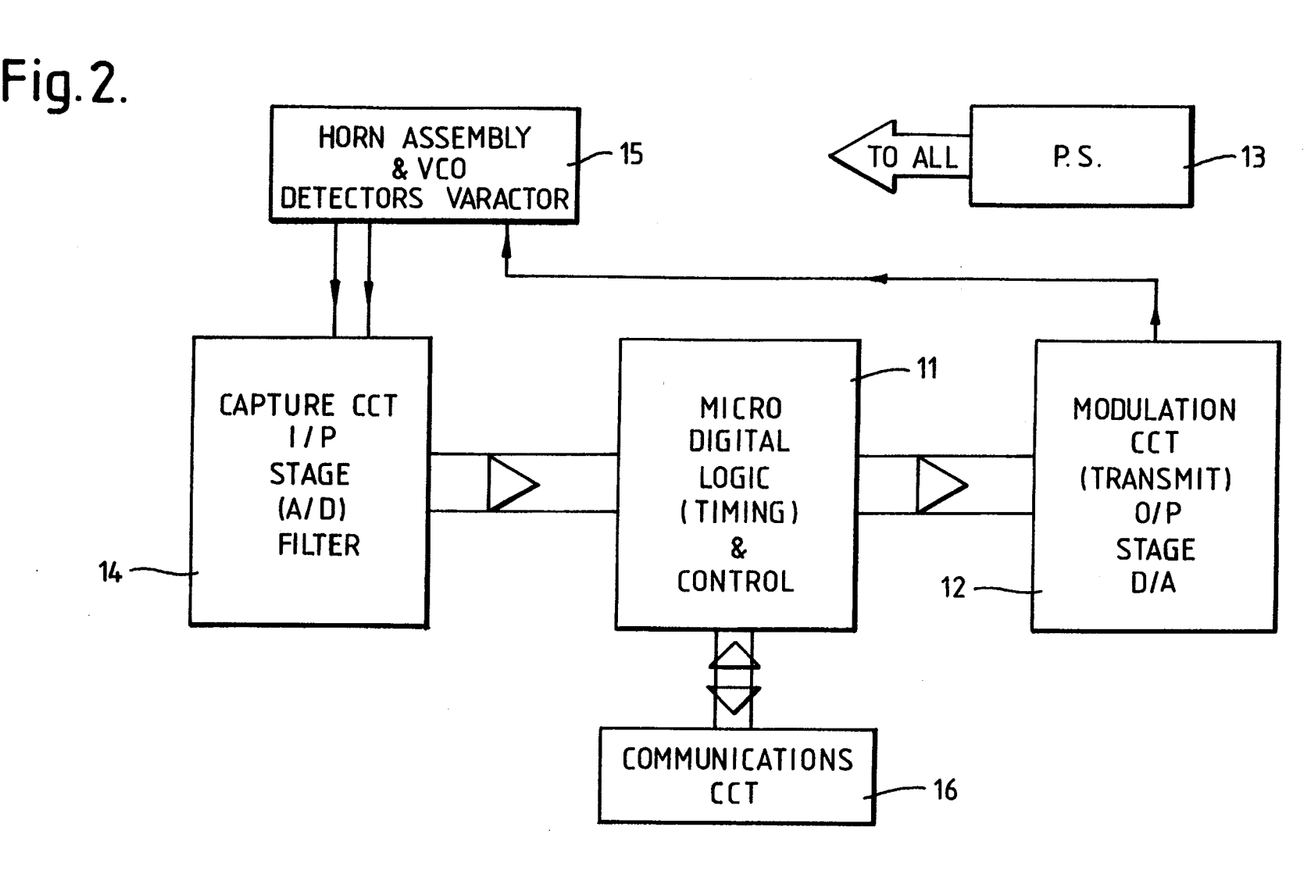
FIG. 2 is a block diagram of the circuitry of the system.

Referring now to FIG. 2, the circuit is based around a 6805 microchip 11 which contains all the read only memory (ROM) and random access memory (RAM) required. This device performs all the calculations and control of the circuitry and the serial and parallel communications.

The transmitted signal is modulated over 15 MHZ with a modulation sweep shape that is triangular.

The frequency linearity is achieved by using a look-up table in the microchip, the output of which is fed to a D/A converter in the output stage 12. This gives a −9 v to −13 v slope in 720 μs which goes to a varactor diode via an operational amplifier. The slope changes the frequency of a gunn diode by 15 MHZ thus causing the frequency modulation.

A power supply circuit 13 receives an AC mains input and provides the following voltages:

| | |
|---|---|
| +5v | Digital supply |
| +15v | analog supply |
| −15v | Analog supply |
| −10v | gunn diode |

A zero crossing detector on the mains input can be employed to synchronise up to 16 radars in the area. An on board 4 bit identification switch generates a selectable sweep delay which will tell the microchip when to proceed to the next sweep, after the set time delay indicated by the switch. This identification switch can also be used by a common line for serial communication.

The microchip controls the digital to analog converter in the output stage 12 and also an analog to digital converter in the input stage 14 so that the output is interleaved with the input. The A/D converter samples the input waveform 16 times, at equal time periods. The microchip uses this data to perform the harmonic analysis.

For temperature compensation, the microchip reads the temperature before each sweep, via the A/D converter which converts a voltage produced by a temperature-sensitive diode attached to the voltage-controlled oscillator (VCO) in the transmitter 15 which carries the horn antenna assembly. The diode also adjusts the dc level of the voltage of the varactor, also in the transmitter 15, when the temperature changes and prevents the nominal frequency of 10.587 GHz from altering. The microchip uses the temperature reading to select a lookup table for the sweep (15 MHz) to compensate for the non-linearity of the VCO with respect to temperature.

The incoming signal from a detector diode in the transmitter is filtered in the input stage 14 so that the maximum frequency is limited to 3 Khz for the doppler signal, and to 833 Hz for the FMCW signal. This limits the presence zone to 6 meters and the speed to 100 mph.

Two light-emitting diodes are mounted at the rear of the radar head to give visual indication of presence detection and doppler.

Optionally, in a mixed system of radar heads, the communications circuitry 16 may be arranged to employ serial communications for indicating the mode of an individual radar and its function i.e.

(a) FMCW (presence detection)
(b) doppler
(c) both
(d) speed setting

The mode of an individual radar could also be software controlled via the same communications network.

Similarly, a batch of radars could be placed under the management of a central computer.

As the microwave components of the radar head are not used for 70% of the time, this dead period between the data collection routines of the microchip can be used, if desired, for radar head to vehicle, e.g. patrol vehicle, communication. This would use the existing microwave components with an extra printed circuit board to adapt the radar head to become a frequency modulated transceiver, as in FIG. 3.

Figure 3:
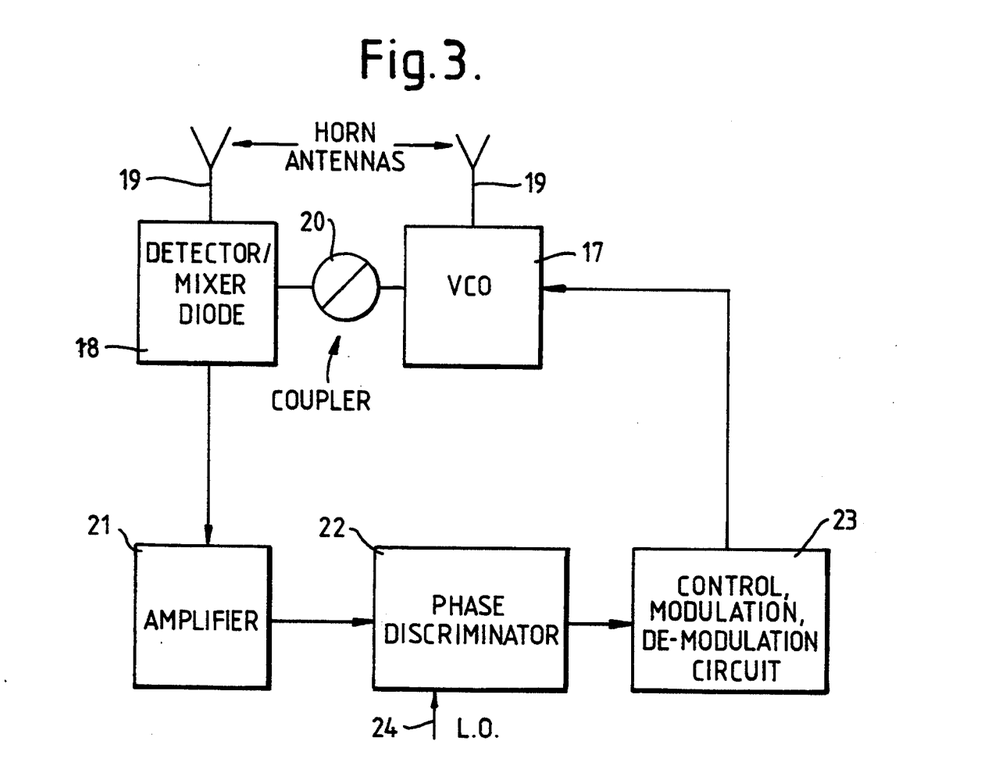
FIG. 3 illustrates adaptation of the system for two-way communication with vehicles.

This shows the voltage-controlled oscillator 17 and the detector/mixer 18, with their respective horn antennae 19, connected by the coupler 20. The incoming signal is routed from the detector/mixer 18 via an amplifier 21 to a phase discriminator 22 provided with a local oscillator 24. A control, modulation and de-modulation circuit 23 receives the incoming signal from the phase discriminator 22 and also controls the VCO 17.

The varactor diode and detector diode can be incorporated into a phase locked-loop which will lock on to the received signal. The signal can be modulated by 10 MHz at a rate of over 100 MHz, which gives a bit rate of 100 Mbit/s when using FSK.

The vehicle would require a transceiver which would work in a similar manner.

The overall operation of the system is as follows. With the radar mounted pointing down a carriageway, the functional stages will be discussed as they occur.

On power up of the radar the following will take place.

(a) All devices will receive power and the microchip will check the temperature and select the appropriate varactor look-up table. All communications ports etc. will be initialised.

(b) The position of the 4 bit identification switch will be scanned to determine its communications code and the sweep delay time.

(c) While the VCO is stabilising, and under a constant frequency condition, incoming data received by the A/D converter is used to decide whether there is a doppler detect (moving vehicle) or not. If there is then the appropriate relay is activated.

(d) The temperature is again measured and temperature compensation effected, if necessary, by reselection of the appropriate varactor look-up table. The FMCW sweep and data collection will start simultaneously after the elapse of the sweep delay.

(e) The collected data is then used to calculate the amplitude of the first harmonic.

(f) [ON THE FIRST PASS ONLY] The first harmonic is recorded as the environmental background data, which will, of course, vary according to where the radar is installed.

(g) The environmental background is subtracted from the current harmonic. This data is then used to decide whether there is a presence (stationary or slow moving vehicle) detect or not. If there is a detect then the appropriate relay is activated.

(h) After the FMCW sweep, the system then goes again into the doppler detect (moving vehicle) routine at constant frequency, after which the temperature compensation is repeated and, if the VCO is stable, the FMCW sweep and collection restarts and the FMCW presence detection is repeated followed by the doppler detect cycle.

In passes subsequent to the first pass, the background storage step is replaced by a background tracking step for updating the stored background data, if necessary. Optionally, after each doppler detection sequence there may be a check to determine if serial communications of data are required to/from other units of a multiple radar system.

Preferably also, there is a self-test sub-routine at the end of each pass.

Figure 4A:
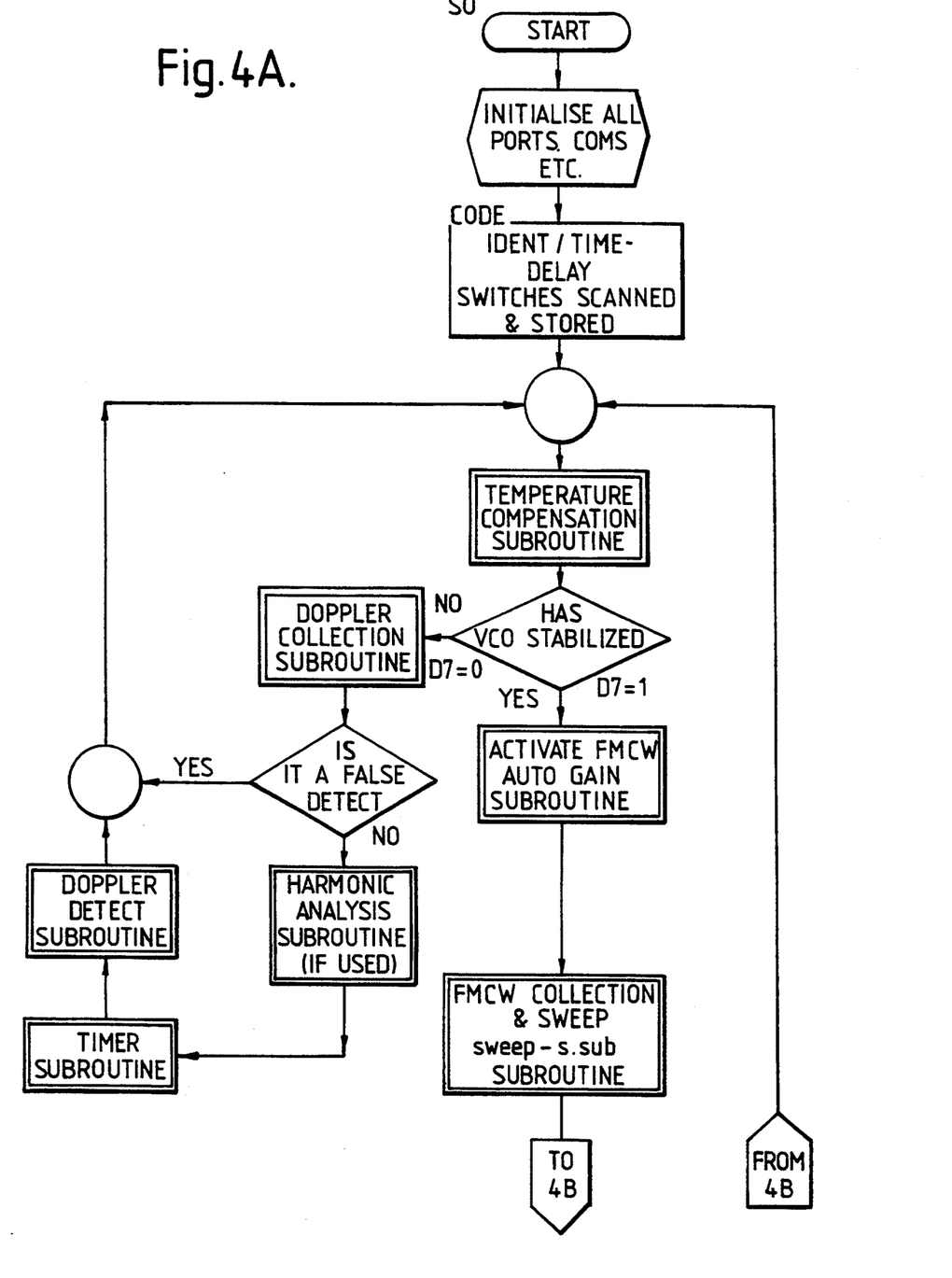
FIGS. 4A and 4B present a flow chart of the main software routine of the system.
Figure 4B:
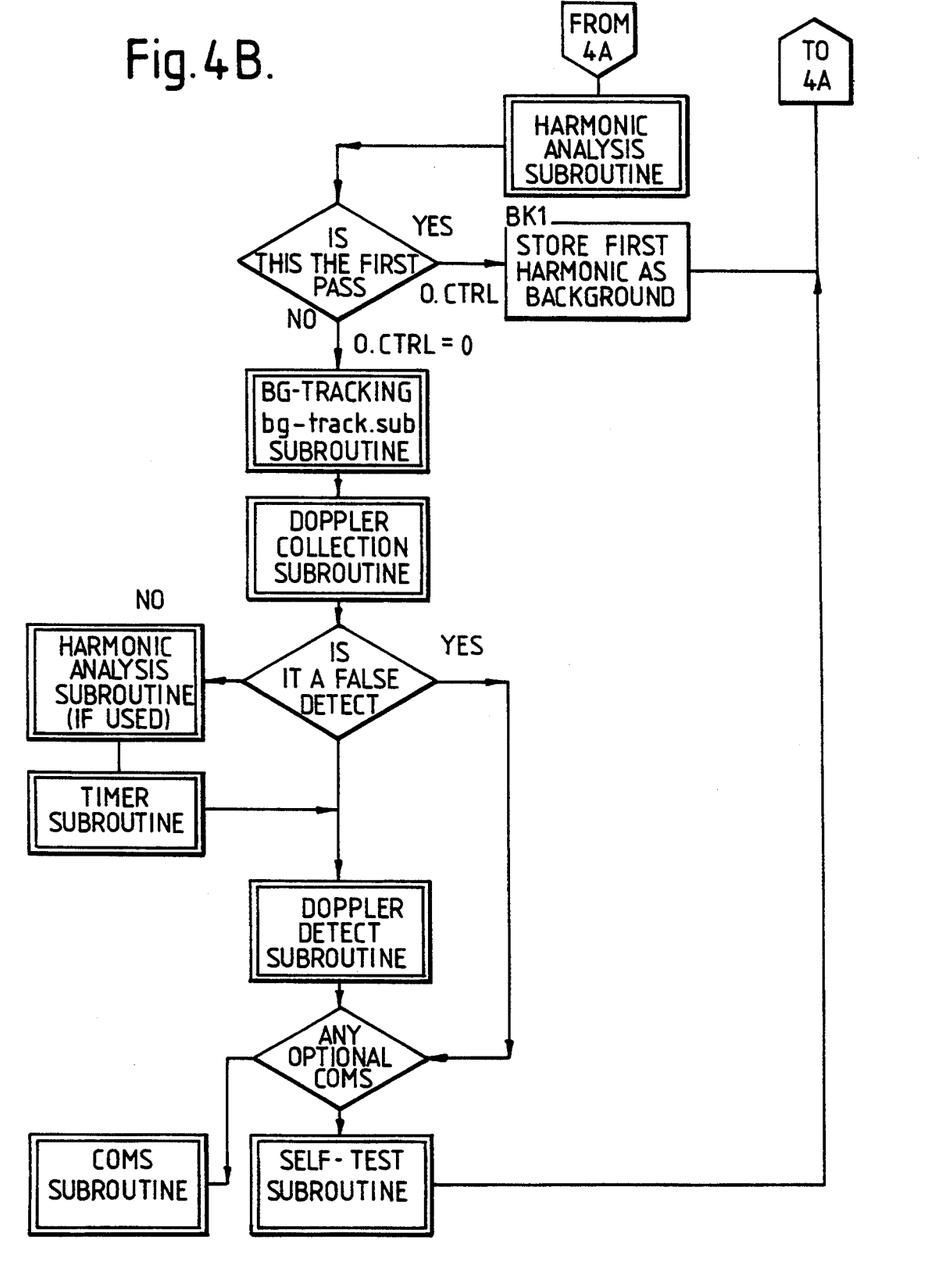
Figure 5:
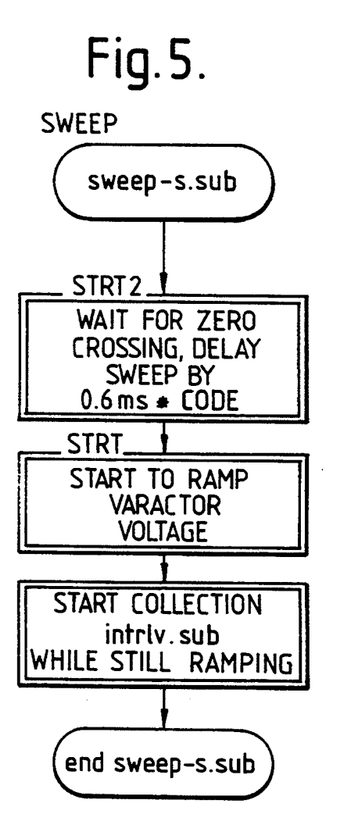
FIGS. 5, 6A and 6B, and 7 to 10 are flow charts of software sub-routines.
Figure 6A:
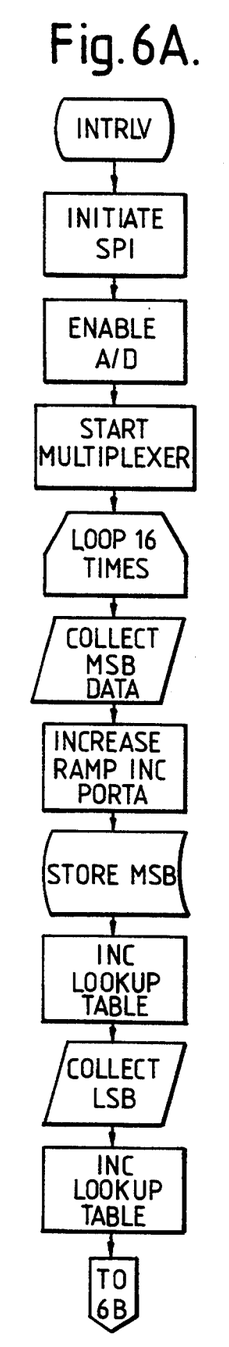
Figure 6B:
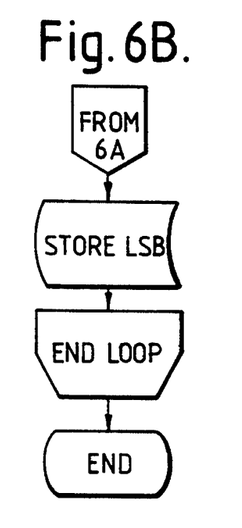
Figure 7:
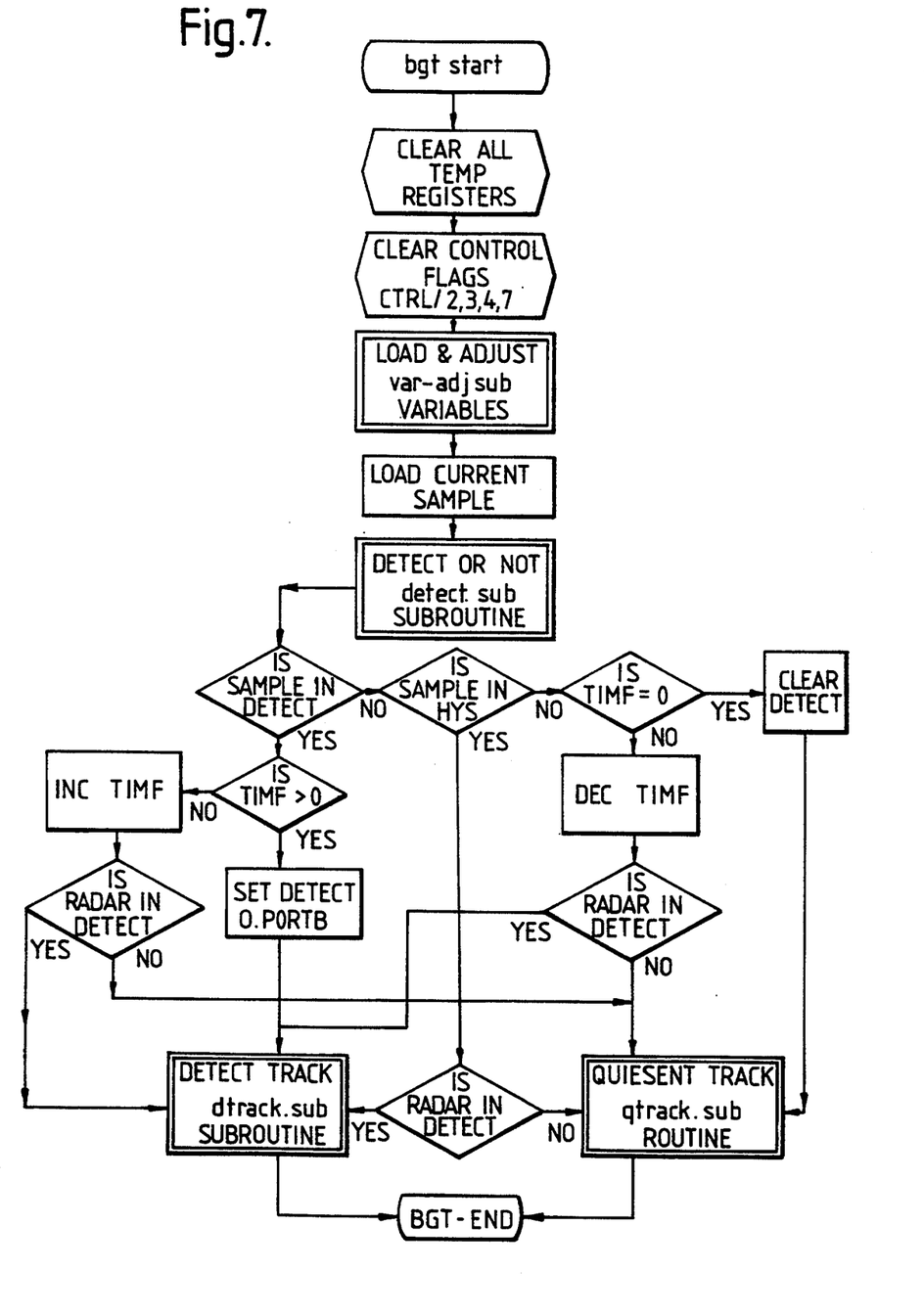
Figure 8:
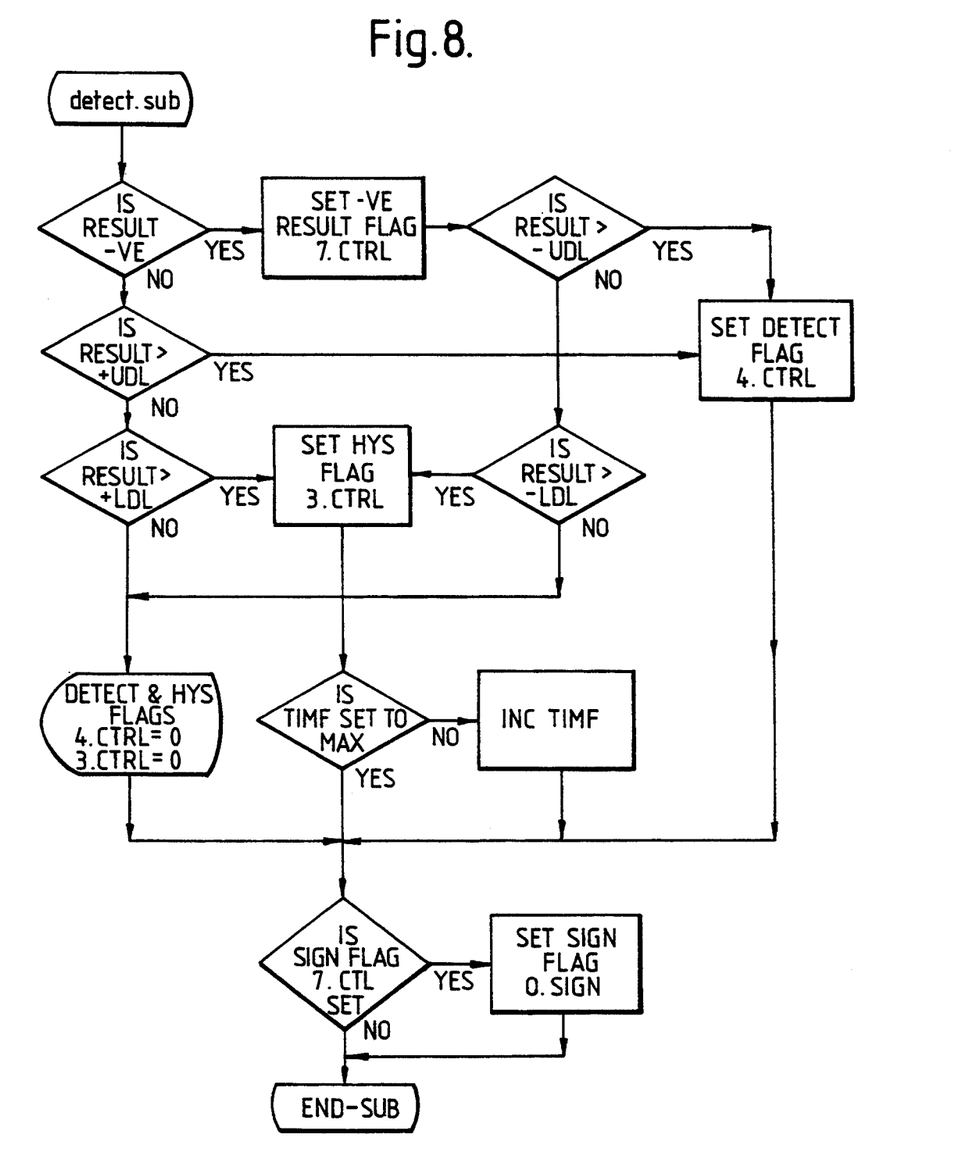
Figure 9:
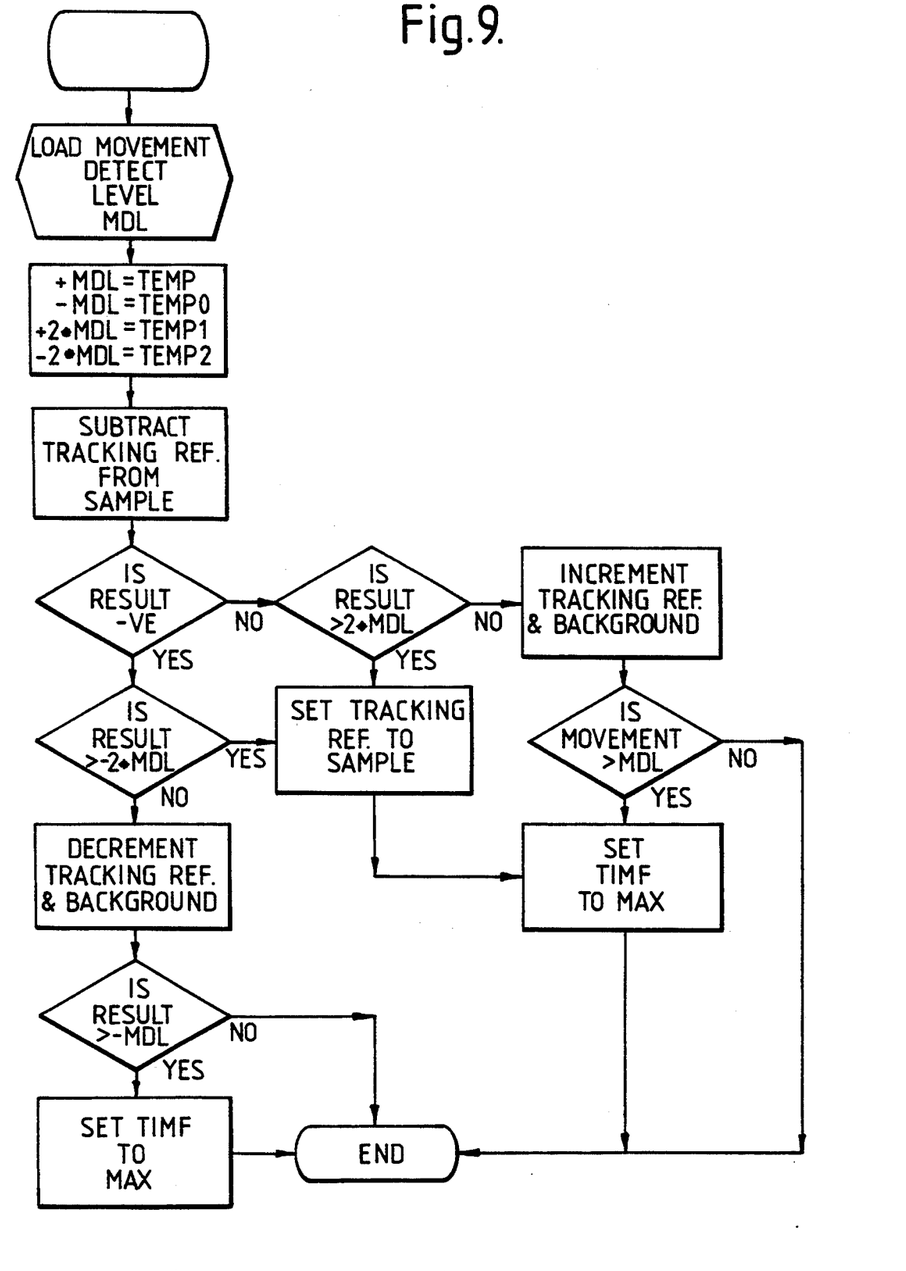
Figure 10:
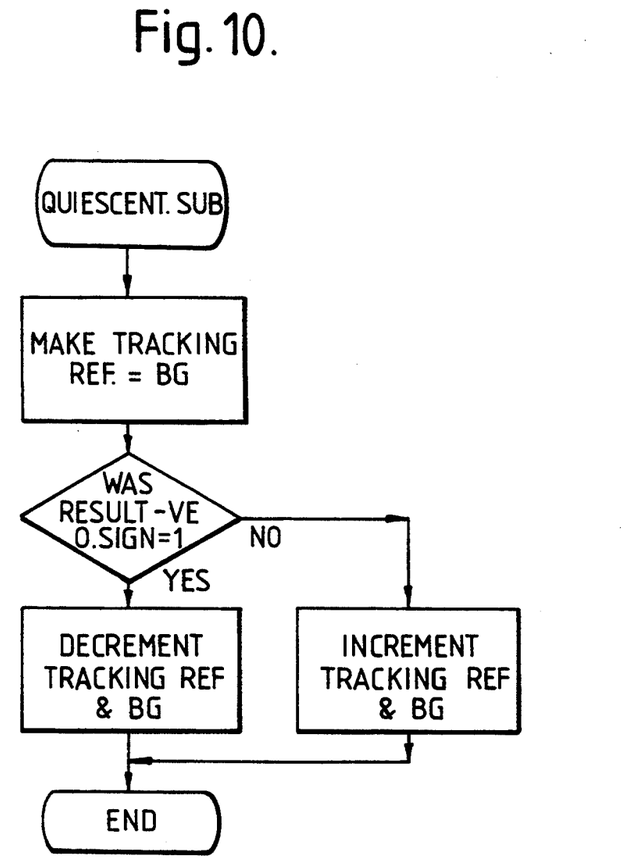

The main software routine is represented by the flow chart of FIGS. 4A and 4B and the more important sub-routines appear in FIGS. 5 to 10.

After the system has been initialised, the temperature compensation sub-routine is performed as already described. The temperature compensation sub-routine is also performed before the main sweep sub-routine shown in FIG. 5, which main sub-routine embraces the data collection interval sub-routine shown in FIGS. 6A and 6B. However, after each temperature compensation a check is made to see if the VCO has stabilised and if the rate of change of temperature is large this check may give the answer "no" in which case the system will enter the doppler sub-routine instead of the FMCW sub-routine. On completion of the doppler sub-routine the system will return to the temperature compensation sub-routine. Before the FMCW sweep sub-routine there is an automatic gain control sub-routine which checks the gain of the analog-to-digital converter. After the FMCW sweep and collection sub-routines the system performs harmonic analysis and then enters the background tracking sub-routine shown in FIG. 7. During this the system determines whether or not there is a presence detect, which involves entering the detect sub-routine shown in FIG. 8. Then, according to whether the radar is showing a presence detect, or not, the background tracking sub-routine enters the detect tracking sub-routine shown in FIG. 9 or the quiescent sub-routine shown in FIG. 10. The background tracking sub-routine discriminates between a vehicle shift and any other shift due to a change in the environment and, if it is decided there is no vehicle detect, then environmental tracking occurs by updating of the background which is stored as sine/cosine harmonic signals.

The timer sub-routine in the doppler mode may be employed to provide an exact frequency and hence the speed of an oncoming vehicle, since the harmonic analysis routine can only give a rough speed measurement. It can also give a below 5 mph cut-off and direction sensing.

We claim:

1. Apparatus for detecting the presence of vehicles for the control of traffic signal lights, comprising:
    at least one radar head;
    means for mounting that head on or adjacent to a traffic signal light head to view the location controlled by the signal lights;
    emission generating means for generating a ramped frequency emission to provide a frequency modulated continuous wave (FMCW) signal to the head for vehicle presence detection in the FMCW mode;
    means for alternatively generating a constant frequency emission to the head for vehicle movement detection in a doppler mode;
    means for switching repeatedly between the FMCW mode and the doppler mode;
    means to deliver a detect signal output whenever a vehicle takes up to a position where it is a target for the radar beam from the radar head; and
    means for adapting the radar head for two-way communication with suitably equipped vehicle, the two-way communication occurring in the dead periods between sending of the FMCW signal and the doppler signal.

2. Apparatus according to claim 1, wherein the emission generating means includes a voltage controlled oscillator (VCO), and further comprising means for checking whether the oscillator has achieved stability before each switching of the radar into the FMCW mode and means for disabling the FMCW mode by switching directly into the doppler mode if the VCO is found to be unstable.

3. Apparatus according to claim 1, further comprising means for periodically performing temperature compensation of the radar and means for activating the VCO stability checking means after each temperature compensation.

4. Apparatus according to claim 1, wherein the detect signal delivering means includes means for performing harmonic analysis of the return signals received by the radar head.

5. Apparatus according to claim 1, further including means for adapting the radar head for two-way communication with a suitably equipped vehicle.

6. Apparatus according to claim 1, further comprising means for selecting a time delay to elapse before each entry into the FMCW mode, to avoid interference with other similar radar heads in the vicinity.

7. Apparatus for detecting the presence of vehicles for the control of traffic signal lights, comprising:
    at least one radar head;
    means for mounting that head on or adjacent to a traffic signal light head to view the location controlled by the signal lights;
    emission generating means for generating a ramped frequency emission to provide a frequency modulated continuous (FMCW) signal to the head for vehicle presence detection in the FMCW mode;
    means for detecting a return signal following generation of such ramped frequency emission;
    means for alternatively generating a constant frequency emission to the head for vehicle movement detection in a doppler mode and detecting a return signal following generation of such constant frequency emission to determine the speed of a vehicle detected;
    means for switching repeatedly between the FMCW mode and the doppler mode;

means for converting that said return signal from said ramped frequency emission from an analogue signal to a digital signal;

means for storing at start up said digital signal to represent the background scene of the location viewed by the FMCW radar beam;

means for comparing said stored digital signal with a subsequent digital signal to check for a difference, a difference corresponding to a vehicle detect;

means to deliver a detect signal output whenever a vehicle takes up a position where it is a target for the radar beam from the radar head; and means for updating said stored background signal data if necessary at the switching of the radar into the FMCW mode by incrementing said stored digital signal towards said subsequent digital signal and thereafter using that incremented signal as the stored digital signal.

8. Apparatus according to claim 7, wherein the emission generating means includes a voltage controlled oscillator (VCO), and further comprising means for checking whether the oscillator has achieved stability before each switching of the radar into the FMCW mode and means for disabling the FMCW mode by switching directly into the doppler mode if the VCO is found to be unstable.

9. Apparatus according to claim 8, further comprising means for periodically performing temperature compensation of the radar and means for activating the VCO stability checking means after each temperature compensation.

10. Apparatus according to any of claim 7, wherein the detect signal delivering means includes means for performing harmonic analysis of the return signals received by the radar head.

11. Apparatus according to any one of claim 7, further including means for adapting the radar head for two-way communication with a suitably equipped vehicle.

12. Apparatus according to any one of claim 7, further comprising means for selecting a time delay to elapse before each entry into the FMCW mode, to avoid interference with other similar radar heads in the vicinity.

* * * * *